(12) United States Patent
Acikgoez

(10) Patent No.: US 7,562,882 B2
(45) Date of Patent: Jul. 21, 2009

(54) SHOPPING CART

(75) Inventor: Ayhan Acikgoez, Guenzburg (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 8 days.

(21) Appl. No.: 12/244,437

(22) Filed: Oct. 2, 2008

(65) Prior Publication Data

US 2009/0033049 A1 Feb. 5, 2009

Related U.S. Application Data

(63) Continuation of application No. PCT/EP2007/002966, filed on Apr. 3, 2007.

(30) Foreign Application Priority Data

Apr. 5, 2006 (DE) .................. 10 2006 016 386

(51) Int. Cl.
*B62B 3/02* (2006.01)

(52) U.S. Cl. .................. 280/33.992; 280/33.991; 280/401; 280/402; 280/639

(58) Field of Classification Search ............ 280/33.992, 280/33.991, 401, 402, 639
See application file for complete search history.

(56) References Cited

U.S. PATENT DOCUMENTS

| | | | |
|---|---|---|---|
| 3,287,841 A | 11/1966 | Spragg et al. | |
| 4,116,456 A * | 9/1978 | Stover et al. | 280/33.993 |
| 4,544,171 A * | 10/1985 | Kellogg | 280/33.992 |
| 4,560,180 A * | 12/1985 | Ulmer | 280/33.993 |
| 4,593,922 A * | 6/1986 | Upshaw et al. | 280/33.992 |
| 5,280,932 A * | 1/1994 | Folsom | 280/33.992 |
| 5,324,055 A * | 6/1994 | Trubiano | 280/33.995 |
| 5,368,318 A * | 11/1994 | Rehrig et al. | 280/33.993 |
| 5,505,472 A * | 4/1996 | Trubiano | 280/33.993 |
| 6,540,240 B2 * | 4/2003 | Nadeau et al. | 280/33.993 |
| 6,932,363 B2 * | 8/2005 | D'Angelo | 280/33.991 |

(Continued)

FOREIGN PATENT DOCUMENTS

DE 32 35 803 A1 3/1984

(Continued)

OTHER PUBLICATIONS

Form PCT/ISA/210 (International Search Report) dated Jul. 25, 2007.

*Primary Examiner*—Christopher P Ellis
*Assistant Examiner*—Cynthia F Collado
(74) *Attorney, Agent, or Firm*—Buchanan Ingersoll & Rooney PC

(57) ABSTRACT

Provided is a nestable (stackable) shopping cart including a pushing device, an undercarriage having casters and carrying a basket having longitudinal and transverse bars, wherein the rear side of the basket provides an opening closeable by a flap pivotable upwards about a horizontal axis into the basket interior. The flap bears against and rests on stop parts when it closes the opening, each stop part arranged on a lower rear transverse bar defining a lower edge of the opening of the basket. Each stop part preferably is a single part having bottom and top portions separated from each other by a connecting piece. Each stop provides a stop and locking region for the flap, the stop and locking region arranged on the right or left side of the top portion, depending on the arrangement of the stop part on the lower rear transverse bar.

9 Claims, 3 Drawing Sheets

U.S. PATENT DOCUMENTS 6,981,708 B1 * 1/2006 Tucker et al. .......... 280/33.992

FOREIGN PATENT DOCUMENTS

| DE | 89 09 059 U1 | 4/1990 |
| DE | 296 20 722 U1 | 1/1997 |
| DE | 20 2004 002 946 U1 | 4/2004 |
| DE | 10 2004 051 040 B3 | 2/2006 |
| EP | 0 845 401 A1 | 6/1998 |

* cited by examiner

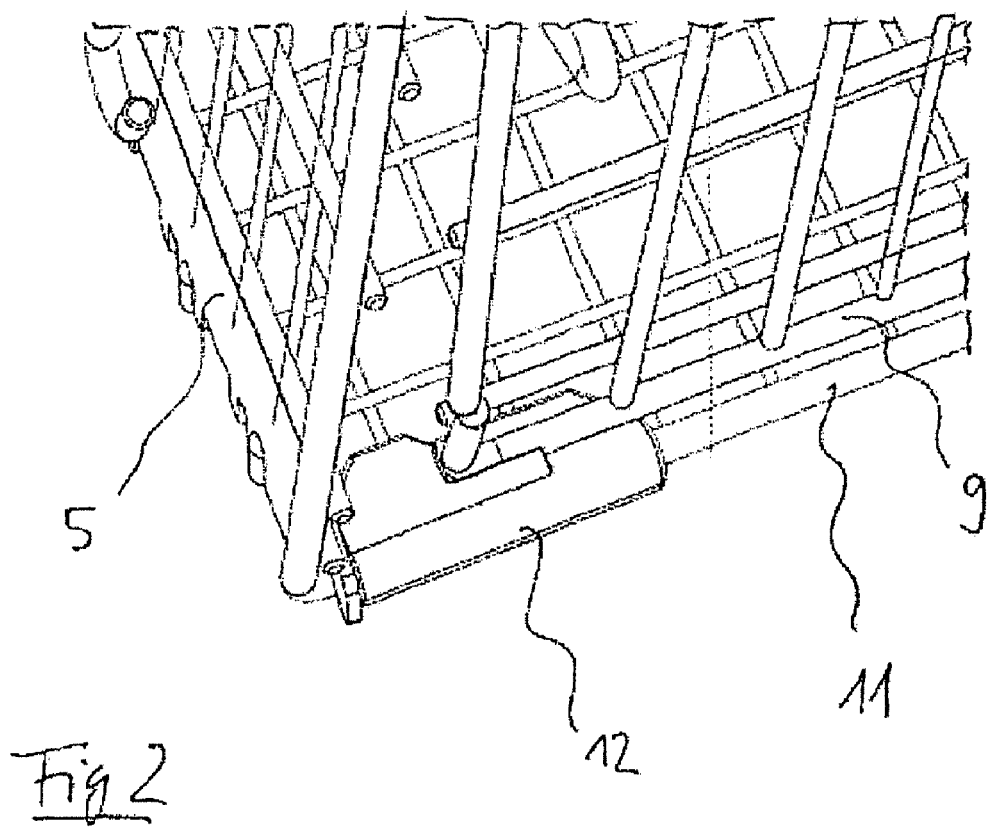
Fig. 2
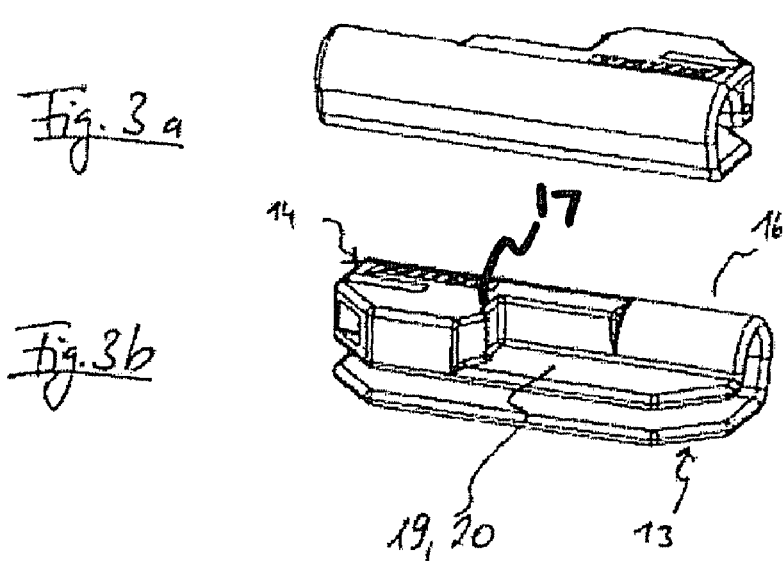
Fig. 3a
Fig. 3b

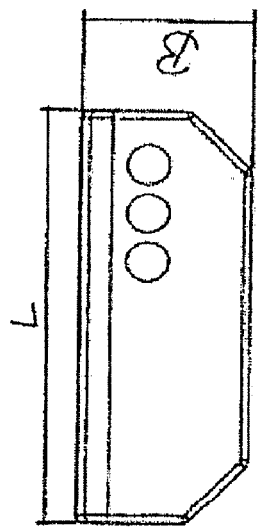
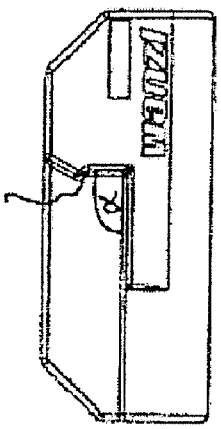
Fig. 3e  Fig. 3f  Fig. 3c  Fig. 3d  Fig. 3g

SHOPPING CART

CROSS-REFERENCE TO RELATED APPLICATIONS

This application is a continuation of PCT Application No. PCT/EP2007/002966, filed Apr. 3, 2007, which claims priority of German Patent Application No. 10 2006 016 386.9, filed Apr. 5, 2006, in the German Patent Office, the disclosures of which are incorporated herein by reference.

BACKGROUND

Shopping carts are used to transport merchandise, luggage, or other objects. They are used particularly in supermarkets.

A shopping cart is described in, for example, the German utility model patent DE 20 2004 002 946 U1, the entire contents of which are hereby incorporated by reference. The shopping cart is described as having a shopping basket, which is provided with a flap on the back side. To achieve a dampening of the noise upon impact of the flap, each basket has at least one stop part that is made of plastic and that is arranged in an exchangeable manner on a lower transverse bar. For attachment, each stop part encompasses another longitudinal bar of the basket.

It is found, however, that jerky movements through the stopping of the flap on the basket walls generate undesirable loud noises. This occurs in particular in the case of those carts that have front steering caster wheels and are equipped at the rear with fixed caster wheels.

BRIEF SUMMARY

Disclosed is a nestable shopping cart having a pushing device and an undercarriage with caster wheels, which carries a basket formed from longitudinal and transverse bars, the back side of the basket having an opening closable by a flap rotatable around a horizontal axis upward into the basket interior, the flap resting on stop parts to close the opening, each stop part arranged on a lower rear transverse bar which defines a lower edge of the opening of the basket, each stop part including a bottom portion spaced apart from and connected to a top portion by a connecting piece clipped onto a portion of the lower transverse bar, wherein each stop part has a stop and locking region to stop and lock the flap to close the opening, wherein the stop and locking region forms a recess on a right or left side of the top portion of the stop part in coordination with the stop part arrangement on the lower rear transverse bar.

BRIEF DESCRIPTION OF THE DRAWINGS

FIG. 2 shows an embodiment of a stop part, arranged on the left side of a lower rear transverse bar of a shopping cart basket of FIG. 1.

FIG. 3a shows a rear perspective view of an embodiment of a stop part having top and bottom portions and a connecting piece.

FIG. 3b shows a front perspective view of the stop part shown in FIG. 3a.

FIG. 3c shows a bottom view of the stop part of FIG. 3a.

FIG. 3d shows a right side view of the stop part of FIG. 3a.

FIG. 3e shows a rear view of the stop part of FIG. 3a.

FIG. 3f shows a left side view of the stop part shown in FIG. 3a.

FIG. 3g shows a top view of the stop part shown in FIG. 3a.

Figure 1:
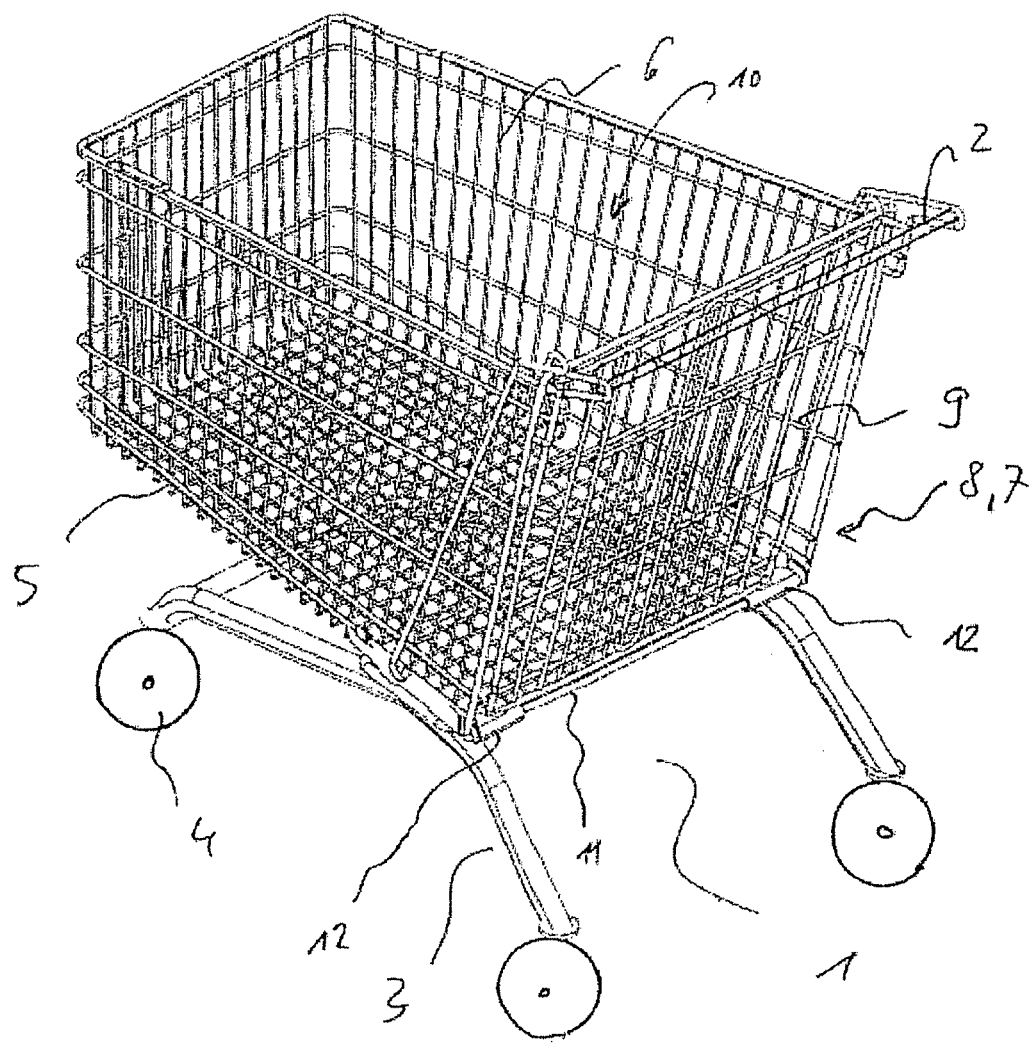
FIG. 1 shows an embodiment of a shopping cart with a basket, pushing device and caster wheels and embodiments of stop parts.

Reference Symbol List: (1) Shopping Cart; (2) Pushing Device; (3) Undercarriage; (4) Caster Wheels; (5) Basket; (6) Longitudinal and Transverse Bars; (7) Opening; (8) Back Side of the Basket; (9) Flap; (10) Basket Interior; (11) Lower Rear Transverse Bar; (12) Stop Part; (13) Bottom Portion; (14) Top Portion; (15) Inside; (16) Connecting Piece; (17) Securing Tab; (18) Upward Projection; (19) Stop and Locking Region; (20) Recess; ($h_A$) Height of the Recess; ($h_O$) Height of the Upper Part.

DETAILED DESCRIPTION

Provided is an embodiment of a shopping cart having an improved stop part. In FIG. 1, an embodiment of a nestable (stackable) shopping cart 1 with a pushing device 2 and an undercarriage 3 is shown. Preferably, the cart 1 has caster wheels 4. These can be four swivel caster wheels or two swivel caster wheels and two fixed caster wheels, whereby the fixed caster wheels are provided for the rear area (back side), i.e., on the same end of the cart where the pushing device is also arranged. The undercarriage 3 carries a basket 5, which is formed from longitudinal and transverse bars 6. An opening 7 is made on the back side 8 of the basket 5. The opening 7 can be closed by a flap 9. The flap 9 can be swiveled (rotated) around a horizontal axis upward into the basket interior 10. As a result, nesting capability is added. To dampen the noise that is produced when a cart 1 is pulled out from a line of carts rearward, the basket has stop parts 12. The flap 9 rests on the stop parts 12, and, when the flap 9 is in the unnested state, i.e., in its starting position, the flap 9 closes the opening 7.

Preferably, the stop part 12 is arranged on a lower rear transverse bar 11 of the opening of the basket 5. Logically, two stop parts 12 are provided, which are arranged in each case on the end of the transverse bar 11, as is also shown in FIGS. 1 and 2. In particular, each stop part 12 comprises the transverse bar 11.

Preferably, the stop part 12 is designed as a single part and has a bottom portion 13 and a top portion 14 that are separated from one another by a connecting piece 16. Preferably the connecting piece 16 is elastically deformable, for example, such as a spring clip. Preferably, the stop part 12 is made of plastic, and because it is made of plastic and because of the design of the connecting piece 16, the distance between bottom and top portions 13, 14 can be varied. This makes possible an easy "clipping" of the stop part 12 onto the transverse bar 11 and also a simple exchange of a stop part 12 in the event that such a one is defective. To ensure better holding of the stop part 12, the connecting piece 16 is preferably designed in a manner that corresponds to the transverse bar 11 (FIGS. 3d and 3f). The height "H" of the entire stop part 12 is preferably formed based on the thickness of the lower rear transverse bar 11.

In addition, each stop part 12 preferably has an upward projection 18 on the inside 15 of the top portion 14. The upward projection snaps over the transverse bar 11 and prevents the spontaneous loosening of the stop part 12 from the transverse bar 11. The upward projection 18 can be made to extend over the entire width "L" (FIG. 3c) of the stop part 12, at only one location, or at multiple locations as desired.

In the preferred embodiment, the top portion 14 of the stop part 12 is designed in such a way that it has a stop and locking region 19 for the flap 9 (FIG. 3b). In this connection, the height ho of the top portion 14 is reduced and forms a recess 20. The flap 9 rests in this stop and locking region 19. The stop and locking region 19 is to be matched in its size to the necessary conditions, i.e., the size can be configured according to the size and shape of the flap 9. The arrangement of the recess 20 is possible on the right or the left side of the top portion 14 depending on the arrangement of the stop part 12 on the lower rear transverse bar 11 of the basket 5. For example, when the stop part 12 is disposed on the left end portion of the lower rear transverse bar 11 at a lower edge of the opening 7 (FIG. 2) the recess 20 can be on the right side of the top portion 14.

The flap 9 thus lies on the stop part 12 and in addition is stopped by two sides of the stop part 12, which are at a right angle α to one another (FIG. 3*g*).

In addition, to secure the flap 9, a securing means 17 is preferred. This can be formed by a projection, as it is shown in FIGS. 3*b* and 3*g*. The arrangement of the securing means 17 is to be provided based on the type, as well as the size and thickness, of flap 9.

The top 14 thus has a height $h_O$ that includes the upward projection 18. In the stop and locking region 19, a height $h_A$ is provided that determines the height of the recess 20. The height $h_A$ of the recess 20 is provided in such a way that the flap 9 is partially surrounded.

Preferably, swinging of the flap 9 is stopped by the arrangement of the two stop parts 12. Also preferably, the width L of the stop part 12 is based on the distance between basket wall and flap 9.

Preferably, the depth "B" of the stop part 12 can be designed accordingly and, like the rest of the structural embodiment, is left to one skilled in the art (FIG. 3*c*).

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A nestable shopping cart having a pushing device, an undercarriage with caster wheels, a basket formed from longitudinal and transverse bars, the back side of the basket having an opening, a flap rotatable around a horizontal axis upward into the basket interior, stop parts arranged on a lower rear transverse bar which defines a lower edge of the opening of the basket, each stop part comprising:
   a bottom portion;
   a top portion spaced apart from the bottom portion;
   a connecting piece clipped on to a portion of the lower rear transverse bar for connecting the bottom portion to the top portion;
   each stop part has a stop and locking region to stop and lock the flap to close the opening;
   the stop and locking region forms a recess on a right or left side of the top portion of the stop part in coordination with the stop part arrangement on the lower rear transverse bar.

2. The nestable shopping cart according to claim 1, wherein each stop part has a securing means on the top portion.

3. The nestable shopping cart according to claim 1, wherein each stop part has an upward projection between top and bottom portions, on the top portion to secure the stop part to the transverse bar.

4. The nestable shopping cart according to claim 1, wherein the recess is sized according to the size of the flap.

5. The nestable shopping cart according to claim 1, wherein a height of the stop part is based on a thickness of the lower rear transverse bar.

6. The nestable shopping cart according to claim 1, wherein a height h of the recess partially encloses the flap.

7. The nestable shopping cart according to claim 1, wherein the stop part is made of plastic.

8. The nestable shopping cart according to claim 7, wherein the stop part is made of injection-molded plastic.

9. A process for the production of a nestable shopping cart according to claim 1, wherein the stop part is produced by means of an injection-molding process.

\* \* \* \* \*